United States Patent
Tsirkin

(10) Patent No.: US 11,907,115 B2
(45) Date of Patent: Feb. 20, 2024

(54) INDIRECT INTERFACE FOR VIRTUAL MACHINE FREE PAGE HINTING

(71) Applicant: Red Hat, Inc., Raleigh, NC (US)

(72) Inventor: Michael Tsirkin, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 102 days.

(21) Appl. No.: 16/863,180

(22) Filed: Apr. 30, 2020

(65) Prior Publication Data
US 2021/0342260 A1    Nov. 4, 2021

(51) Int. Cl.
*G06F 12/02* (2006.01)
*G06F 9/455* (2018.01)
*G06F 12/1009* (2016.01)

(52) U.S. Cl.
CPC ...... *G06F 12/0253* (2013.01); *G06F 9/45558* (2013.01); *G06F 12/1009* (2013.01); *G06F 2009/45583* (2013.01)

(58) Field of Classification Search
CPC ............ G06F 12/0253; G06F 9/45558; G06F 12/1009; G06F 2009/45583
See application file for complete search history.

(56) References Cited

U.S. PATENT DOCUMENTS

| 10,534,720 | B2 * | 1/2020 | Shih ...................... G06F 12/123 |
| 2013/0031293 | A1 * | 1/2013 | Van Riel ............. G06F 9/45545 711/6 |
| 2018/0059956 | A1 * | 3/2018 | Tsirkin ................ G06F 9/45558 |
| 2018/0150232 | A1 * | 5/2018 | Tsirkin ................ G06F 9/45558 |
| 2018/0267827 | A1 * | 9/2018 | Kanno ....................... G06F 1/30 |
| 2019/0065267 | A1 * | 2/2019 | van Riel ............. G06F 9/45558 |
| 2019/0179538 | A1 * | 6/2019 | van Riel ............. G06F 12/1036 |
| 2021/0182191 | A1 * | 6/2021 | Hildenbrand ....... G06F 9/45558 |

OTHER PUBLICATIONS

William Fehlhaber, About LIFO and FIFO Data Structures (The Basics), Jan. 8, 2019, LinkedIn, https://www.linkedin.com/pulse/lifo-fifo-data-structures-basics-william-fehlhaber (Year: 2019).*
Konrad Miller, Fabian Franz, Thorsten Groeninger, Marc Rittinghaus, Marius Hillenbrand, Frank Bellosa; "KSM++; Using I/O-based hints to make memory-deduplication scanners more efficient"; Karlsruhe Institute of Technology (KIT); RESoLVE'12; Mar. 3, 2012; London, UK; 8 Pages.

* cited by examiner

*Primary Examiner* — Charles Rones
*Assistant Examiner* — Alexander Vinnitsky

(57) ABSTRACT

A system includes a memory, a processor in communication with the memory, a hypervisor, and a guest OS. The guest OS is configured to store a plurality of hints in a list at a memory location. Each hint includes an address value and the memory location of the list is included in one of the respective address values associated with the plurality of hints. The guest OS is also configured to pass the list to the hypervisor. Each address value points to a respective memory page of a plurality of memory pages including a first memory page and a last memory page. The hypervisor is configured to free the first memory page pointed to by a first hint of the plurality of hints and free the last memory page pointed to by a second hint of the plurality of hints. Additionally, the last memory page includes the list.

19 Claims, 8 Drawing Sheets

INDIRECT INTERFACE FOR VIRTUAL MACHINE FREE PAGE HINTING

BACKGROUND

Through virtualization, a host machine may allocate a certain amount of its resources to various virtual machines. Each virtual machine is then able to use the allocated resources to execute applications, including operating systems (referred to as guest operating systems). A software layer that provides the virtualization is commonly referred to as a hypervisor. The hypervisor may emulate the underlying hardware of the host computer, making the use of the virtual machine transparent to the guest operating system and the user of the computer.

A host machine may accommodate more virtual machines than the size of its physical memory allows. Using virtual memory techniques, the host machine may give each virtual machine the impression that it has a contiguous address space, while in fact the memory used by the virtual machine may be physically fragmented and even overflow to disk storage. Memory may be persisted or freed by a hypervisor. In some examples, when the host machine needs to free up memory, the host may select memory pages that have been assigned to virtual machines, and may page out the contents of those memory pages to secondary storage. When the virtual machines attempt to access those memory pages, the host machine may page in the contents of the memory page by reading the contents that have been stored in the secondary storage and writing those contents back to memory.

SUMMARY

The present disclosure provides new and innovative systems and methods for an indirect interface for virtual machine free page hinting. In an example, a system includes a memory, a processor in communication with the memory, a hypervisor, and a guest OS. The guest OS is configured to store a plurality of hints in a list at a memory location. Each hint includes an address value and the memory location of the list is included in one of the respective address values associated with the plurality of hints. The guest OS is also configured to pass the list to the hypervisor. Each address value points to a respective memory page of a plurality of memory pages including a first memory page and a last memory page. The hypervisor is configured to free the first memory page pointed to by a first hint of the plurality of hints and free the last memory page pointed to by a second hint of the plurality of hints. Additionally, the last memory page includes the list.

In an example, a method includes storing, by a guest OS, a plurality of hints in a list at a memory location. Each hint includes an address value and the memory location of the list is included in one of the respective address values associated with the plurality of hints. The method also includes passing, by the guest OS, the list to a hypervisor. Each address value points to a respective memory page of a plurality of memory pages including a first memory page and a last memory page. Additionally, the method includes freeing, by the hypervisor, the first memory page pointed to by a first hint of the plurality of hints, and freeing, by the hypervisor, the last memory page pointed to by a second hint of the plurality of hints. Additionally, the last memory page includes the list.

In an example, a method includes storing, by a guest OS, a plurality of hints at a memory location. Each hint includes an address value and the memory location of the plurality of hints is included in one of the respective address values. The method also include passing, by a guest OS, a range of memory to the hypervisor. The range of memory includes the memory location. Additionally, the method includes marking, by the hypervisor, the range of memory including the plurality of hints as free. The range of memory includes the respective address values associated with the plurality of hints.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
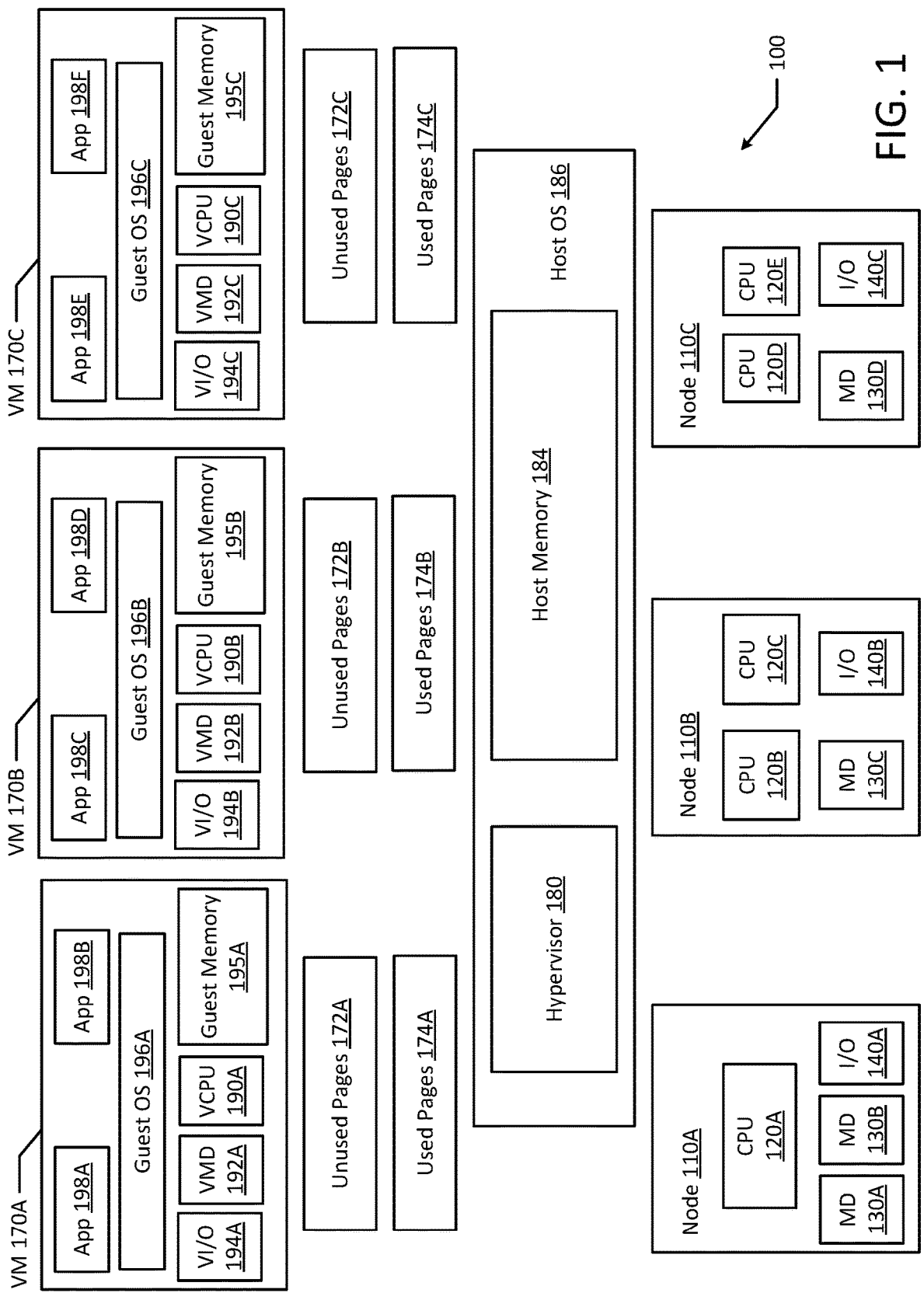
FIG. 1 illustrates a block diagram of an example computing system according to an example embodiment of the present disclosure.

Techniques are disclosed for an indirect interface for virtual machine free page hinting. Lack of synchronization in memory handling is a source of virtualization overhead. For example, a page of memory that is unused by a virtual machine may appear to be a page with valid data or "dirty" to a hypervisor. When a page appears to contain valid data and the hypervisor treats the page of memory as such, the hypervisor may spend valuable CPU time on persisting the page.

The contents or data of some memory pages should be preserved. For example, the hypervisor may persist the page of memory such that the page of memory can continue to be accessed using memory instructions (or memory APIs) even after the end of a process that created or modified the page of memory. One example of persistent memory is an online shopping cart. A persistent online shopping cart keeps track of unpurchased items that are left in the cart and saves the information for a customer's next visit. For example, a customer that revisits a website may have the contents of their persistent online shopping cart restored when they revisit the website.

One solution to reduce or eliminate the time and CPU resources spent persisting an unused page of memory that appears to be "dirty" is to utilize free page hinting. With the approach of virtual machine free page hinting, a page that is free or unused by the virtual machine is passed to the hypervisor in the form of a hint. The hint may be in the form of an address of the page. Even though these free page hints may reduce virtualization overhead, the hints add an additional layer of overhead. For example, hints that are passed to the hypervisor are typically passed through memory shared with the guest operating system (OS) of the virtual machine. However, passing a hint such as a 64-bit address and length of a page may incur up to 16 bytes of additional overhead. For example, to pass the hint to the hypervisor may include allocating an additional 16 bytes. An example directory may have a size of 4096 bytes and the 16 bytes used for the hint may cost approximately 0.4 percent memory overhead (e.g., 16/4096=0.0039). The increase in memory overhead may make free page hinting unsuitable for some workloads.

Other solutions may include compression strategies and maintaining bitmaps to reduce overhead associated with persisting memory. For example, the guest OS may provide the hypervisor with a hint as to whether a memory page in guest memory is being used by the guest (e.g., active in guest memory) or not being used by the guest (e.g., inactive in guest memory). The free page hints may be provided in a bitmap or bit array where each memory page corresponds to a bit of information in the bitmap. If the hint indicates that the page is used by the guest, the hypervisor may persist the page. If the hint indicates that the page is free or unused by the guest OS, the hypervisor may avoid persisting the page. However, the compression strategies and maintaining bitmaps may be computationally intensive and may result in increased overhead depending on the type of workload.

To reduce the overhead associated with the free page hinting approach discussed above, a guest OS may pass a hint through memory. The hint may include an address and optionally a length (e.g., an address-length pair or and address-length tuple). The hint may be passed as a pair or tuple of 64-bit values and since these values are unused after the hypervisor has read the values and acted on the values (e.g., by marking the pages as free or "clean"), the memory used for hinting may also be passed to the hypervisor to be freed. For example, the guest OS may use the memory to be hinted (or a portion of the memory to be hinted) and use that memory (or portion) to store the hints (e.g., address or address-length pairs) and then pass the memory to be hinted to the hypervisor.

To avoid the overhead documented above with respect to the free page hinting approach, the memory or portion of the memory that is used to store the hints is passed to the hypervisor and marked as free or "clean." For example, the hypervisor may act on the memory page that includes the hints as if the memory page was itself hinted. Alternatively, the hypervisor may act on hints in the order the hints appear in memory and the guest OS may include a final hint to the memory storing the other hints such that the memory storing the other hints is eventually marked as free or "clean" by the hypervisor.

Therefore, systems with abundant free memory can allocate some of the free memory for hints. Additionally, systems with scarce free memory can allocate some of the free memory for hints knowing that the memory including the hints is eventually freed by the hypervisor and will be available for reuse. Since free page hinting may be periodically used, permanently reserving memory for free page hinting may be wasteful. For example, any overhead associated with storing the hints in memory is temporary as the hinted memory along with the memory storing the hints is freed by the hypervisor. Additionally, since different memory may be used to store hints when the guest wants to free up memory, memory that the guest intends to free up may be used to store the hints, thereby reserving other unused memory for other purposes and functions other than hinting. For example, the hints may be stored in memory that was already used by the guest and would otherwise sit idle and unused until it is freed by the hypervisor. Freeing the memory used to store the hints instead of permanently reserving memory for the sole purpose of hinting advantageously saves up to 0.4 percent of the memory.

Virtualization may allow a host machine to run multiple virtual environments, for example using a hypervisor (e.g., Kernel-based Virtual Machine ("KVM")) on an operating system, such as Red Hat® Enterprise Linux® ("RHEL"). When handling memory, hypervisor vendors and operating system ("OS") vendors often attempt to improve efficiency and reduce overhead. An example vendor is Red Hat®, which offers RHEL. The present disclosure is especially advantageous for hypervisor vendors that may be interested in implementing page hinting to reduce virtualization overhead. By implementing the solution above, a hypervisor vendor may provide optimized memory handling synchronization and reduce or eliminate valuable CPU time that is otherwise used persisting memory pages that are unused but appear to be "dirty" to the hypervisor.

FIG. 1 depicts a high-level component diagram of an example computing system 100 in accordance with one or more aspects of the present disclosure. The computing system 100 may include an operating system (e.g., host OS 186), one or more virtual machines (VM 170A-C), and nodes (e.g., nodes 110A-C).

Virtual machines 170A-C may include a guest OS, guest memory, a virtual CPU (VCPU), virtual memory devices (VMD), and virtual input/output devices (VI/O). For example, virtual machine 170A may include guest OS 196A, guest memory or virtual machine memory 195A, a virtual CPU 190A, a virtual memory device(s) 192A, and a virtual input/output device(s) 194A. Virtual machine memory 195A may include one or more memory pages. The memory pages may be unused pages (e.g., unused pages 172A) or used pages 174A (e.g., memory pages that are include valid data and are "dirty"). Similarly, virtual machine 170B may include guest OS 196B, virtual machine memory 195B, a virtual CPU 190B, a virtual memory device(s) 192B, and virtual input/output device(s) 194B. Virtual machine memory 195B may include one or more memory pages, such as unused pages 172B and/or used pages 174. Virtual machine 170C may include guest OS 196C, virtual machine memory 195C, a virtual CPU 190C, a virtual memory device(s) 192C, and virtual input/output device(s) 194C. Virtual machine memory 195C may include one or more memory pages, such as unused pages 172C and/or used pages 174. As used herein, unused pages 172A-C may be generally referred to as unused page(s) 172. Unused pages 172 may be considered "clean" by the hypervisor 180. Similarly, used pages 174A-C may be generally referred to as used page(s) 174. Used pages 174 may be considered "dirty" by the hypervisor 180.

The computing system 100 may also include a hypervisor 180 and host memory 184. Hypervisor 180 may manage host memory 184 for the host operating system 186 as well as memory allocated to the virtual machines 170A-C and guest operating systems 196A-C such as guest memory or virtual machine memory 195A-C provided to guest OS 196A-C. Host memory 184 and virtual machine memory 195A-C may be divided into a plurality of memory pages that are managed by the hypervisor 180. Virtual machine memory 195A-C allocated to the guest OS 196A-C may be mapped from host memory 184 such that when a guest application 198A-F uses or accesses a memory page of virtual machine memory 195A-C, the guest application 198A-F is actually using or accessing host memory 184.

Hypervisor 180 may be configured to scan a page of the virtual machine memory or guest memory (e.g., guest memory 195A-C) to detect whether the page is used or unused (e.g., "dirty" or "clean"). The hypervisor may also check a free page hint associated with the memory page. If the free page hint indicates that page is used by a guest OS (e.g., guest OS 196A), the page may be persisted by the hypervisor. In another example, pages that are used by the guest OS that are duplicates of other memory pages may be deduplicated by the hypervisor. The hypervisor 180 may merge the contents of the memory page with the duplicate page. For example, the page table of virtual machine 170A, guest OS 196A, and/or application 198A may be modified to point to the combined memory page instead of having entries for two different duplicate pages.

If the guest OS no longer needs the data associated with a memory page, the guest OS (e.g., guest OS 196A-C) may include the page on a free list to indicate that the page (e.g., unused page 172A) is no longer used by guest OS 196A. By including the page as a free page or an unused page, the page may be freed by the hypervisor 180 without the computational cost and CPU time spent persisting the page. Additionally, the memory that stores the free list may also be included as a hint such that the memory storing the free list is also freed by the hypervisor 180 thereby saving up to 0.4 percent of the memory compared to other free page hinting approaches that constantly maintain that memory as overhead.

The virtual machines, such as VM 170A may execute a guest operating system 196A and run applications 198A-B, which may utilize the underlying VCPU 190A, VMD 192A, and VI/O device 194A. One or more applications 198A-B may be running on the virtual machine 170A under the respective guest operating system 196A. A virtual machine (e.g., VM 170A-C, as illustrated in FIG. 1) may run on any type of dependent, independent, compatible, and/or incompatible applications on the underlying hardware and OS. In an example, applications (e.g., App 198A-B) running on a virtual machine 170A may be dependent on the underlying hardware and/or OS 186. In another example, applications 198A-B running on a virtual machine 170A may be independent of the underlying hardware and/or OS 186. For example, applications 198A-B running on a first virtual machine 170A may be dependent on the underlying hardware and/or OS 186 while applications (e.g., application 198C-D) running on a second virtual machine (e.g., VM 170B) are independent of the underlying hardware and/or OS 186. Additionally, applications 198A-B running on a virtual machine 170A may be compatible with the underlying hardware and/or OS 186. In an example, applications 198A-B running on a virtual machine 170A may be incompatible with the underlying hardware and/or OS 186. For example, applications 198A-B running on one virtual machine 170A may be compatible with the underlying hardware and/or OS 186 while applications 198C-D running on another virtual machine 170B are incompatible with the underlying hardware and/or OS 186. In an example, a device may be implemented as a virtual machine (e.g., virtual machine 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-C may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-E may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
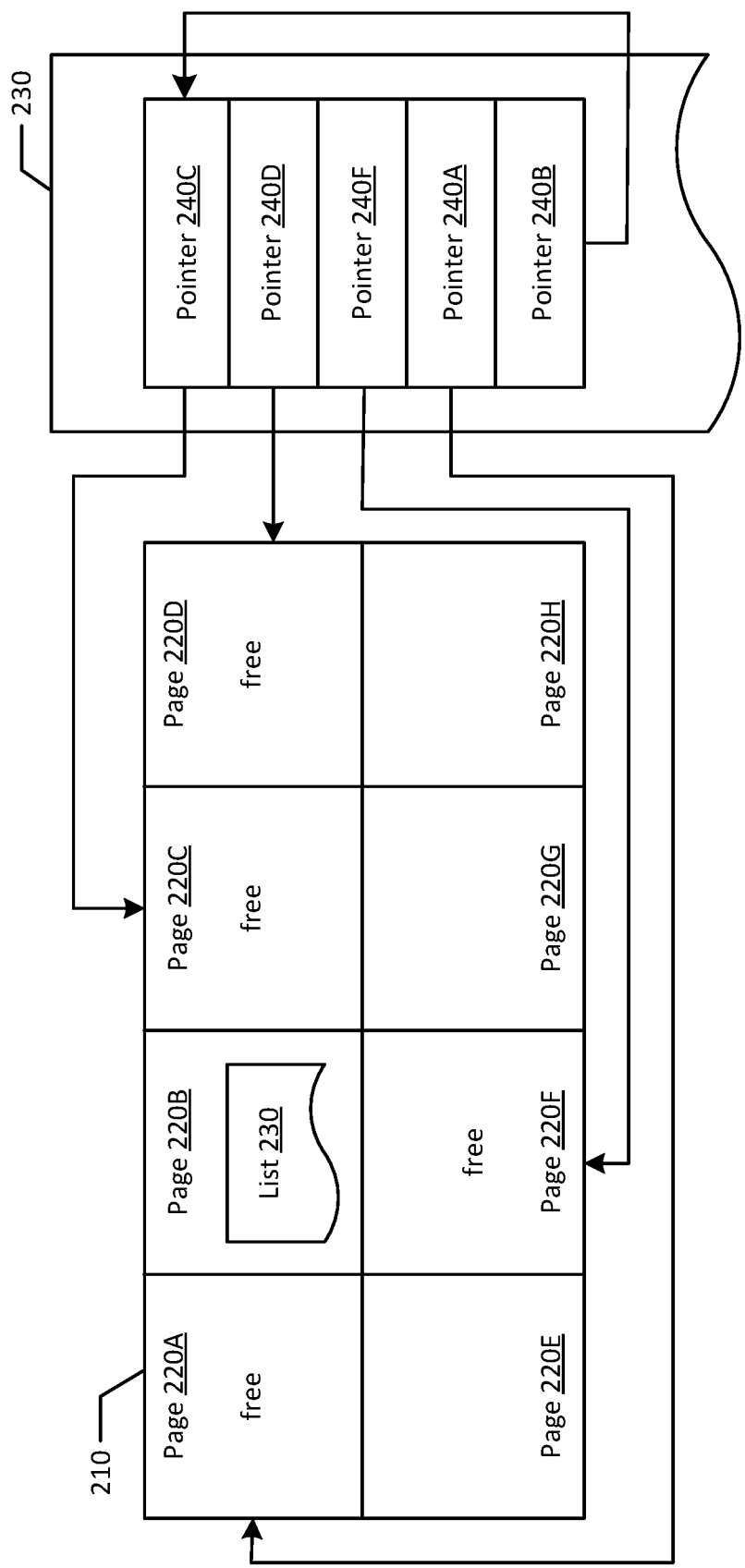
FIG. 2 illustrates a block diagram of a range of memory pages and a list of hints according to an example embodiment of the present disclosure.

FIG. 2 illustrates a block diagram of a range of memory pages and a list of hints indicating which pages in the range of memory pages should be freed by the hypervisor 180. For example, a range 210 of memory, such as memory pages 220A-H may be unused pages 172 or used pages 174. As used herein, an unused page 172 may be a page that once was a used page 174, but is no longer used by the guest OS 196 and therefore may be freed by the hypervisor 180 for reuse. Additionally, an unused page 172 or a page that is no longer used by the guest OS 196 may be freed by the hypervisor 180 instead of being persisted by the hypervisor 180. For example, the contents or data associated with the memory page can be freed as future access to the contents or data may be unnecessary.

As illustrated in FIG. 2, the list 230 is stored at a memory location (e.g., memory page 220B). The list 230 includes hints such as addresses or pointers 240 (e.g., pointers 240A, 240B, 240C, 240D and 240F that are associated with memory pages 220A, 220B, 220C, 220D and 220F respectively). The pointers 240 point to the memory pages that are to be freed by the hypervisor 180. For example, the hypervisor 180 may read the address values or pointers 240 and then free the memory pages 220 pointed to by the pointers 240.

As discussed above, a hint may include an address. In another example, the hint may include an address-length pair or an address-length tuple. The pair or tuple of values may be 64-bit values. Since the values stored in the memory (e.g., values stored in the list 230) are no longer in use after the hypervisor 180 has read the values and acted on them (e.g., freed a memory page by marking the page as free or "clean"), the memory associated with the list 230 may also be passed to the hypervisor 180 as a hint. Then, the hypervisor may act on the hint such that the memory (e.g., memory page 220B) associated with the list 230 can also be freed. For example, the list 230 may include hints for five different memory pages. The first hint in the list may be a pointer 240C that points to memory page 220C. The hypervisor 180 may free memory page 220C and mark the page as free or "clean." Then, the hypervisor 180 may proceed to the next hint (e.g., pointer 240D) that points to memory page 220D and the hypervisor 180 may free memory page 220D. Freeing the memory page 220D may include marking page 220D as free or "clean" and discarding the contents of the memory page 220D. The next hints in the list 230 include pointer 240F and pointer 240A, which points to memory pages 220F and 220A respectively. Similar to the previous hints, the hypervisor 180 may read the hints and free memory pages 220F and 220A. The hypervisor 180 may read hints one-by-one and free memory pages 220 consecutively in-order. In another example, the hypervisor 180 may read hints in batches. For example, the hypervisor 180 may read multiple hints and free multiple memory pages concurrently.

The last hint in the list 230 is a hint that points to the list 230 or that points to the memory location (e.g., memory page 220B) that stores the list. By including the memory associated with the list 230 as a hint, the hinted memory along with the memory that includes the hints (e.g., memory page 220B storing the list 230 of hints) is freed by the hypervisor 180 thereby eliminating the 0.4 percent of memory overhead associated with other free page hinting approaches.

Figure 3:
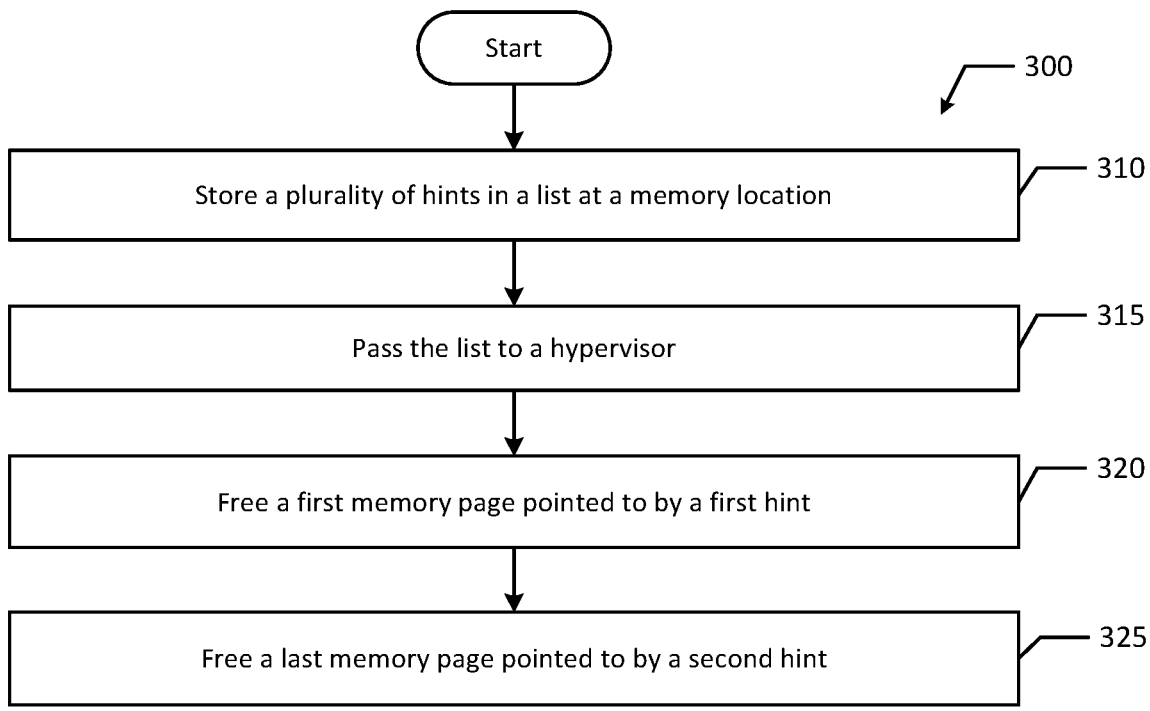
FIG. 3 illustrates a flowchart of an example process for free page hinting according to an example embodiment of the present disclosure.

FIG. 3 illustrates a flowchart of an example method 300 for free page hinting according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated or iterated, and some of the blocks described are optional. The method 300 may be performed by processing logic that may comprise hardware (circuitry, dedicated logic, etc.), software, or a combination of both.

The example method 300 includes storing a plurality of hints in a list at a memory location (block 310). For example, a guest OS 196 may store a plurality of hints in a list 230 at a memory location. Each hint 230 may include an address value and the memory location of the list 230 may be included in one of the respective address values associated with the plurality of hints. In an example, the hints may include address values, pointers 240, lengths, address-length pairs or address-length tuples. The hints (e.g., free page hints) may be provided in a memory page hint data structure, such as a list 230. However, other data structures may also be used. The list 230 or other data structure may indicate a page status corresponding to a memory page (e.g., page is used by guest OS 196 or page is unused by guest OS 196). In an example, the memory page data hint structure may be provided by the hypervisor 180 to the guest OS 196. For example, the hypervisor 180 may indicate that a list 230 should be used. Additionally, hypervisor 180 may provide a memory page hint data structure (e.g., list 230) corresponding to each virtual machine 170 or guest OS 196. For example, there may be a free page hint list 230 for each respective virtual machine 170 (e.g., virtual machines 170A-C) or guest OS 196 (e.g., guest OS 196A-C). In an example, the list 230 is structured to be writable by the guest OS 196 and readable by the hypervisor 180.

Then, method 300 includes passing the list to a hypervisor (block 315). For example, the guest OS 196 may pass the list 230 to the hypervisor 180. Each address value in the list 230 may point to a respective memory page 220 of a plurality of memory pages having a first memory page (e.g., memory page 220C) and a last memory page (e.g., memory page 220B). The list may include a hint to each memory page 220 that the guest OS wishes to free. For example, the guest OS 196 may include page hint on the list 230 when the guest OS 196 needs the memory for something new, such that the memory page 220 may be freed and recycled. Method 300 also includes freeing a first memory page pointed to by a first hint (block 320). For example, the hypervisor may free the first memory page (e.g., memory page 220C) pointed to by a first hint (e.g., pointer 240C) of the plurality of hints. The hypervisor 180 may free a page by marking the page as free or "clean" and discarding the contents of the page. For example, the memory page 220C may have included data once used by the guest OS 196 that is no longer useful. Even though the data is no longer useful, the memory page 220C appears "dirty" to the hypervisor 180 such that the hypervisor 180 may spend valuable CPU time persisting memory page 220C. However, by indicating that memory page 220C should be freed and including a hint to memory page 220C, the hypervisor 180 may free the page and discard the contents without spending any time persisting the page.

Additionally, method 300 includes freeing a second memory page pointed to by a second hint (block 325). For example, the hypervisor may free the last memory page (e.g., memory page 220B) pointed to by a second hint (e.g., pointer 240B) of the plurality of hints. The last memory page (e.g., memory page 220B) may include the list 230 such that each of the hinted memory pages (e.g., memory page 220C) as well as the memory page (e.g., memory page 220B) storing the list 230 are freed. Therefore, the hypervisor 180 may efficiently free memory pages by marking the pages as free or "clean" while discarding the old contents of those memory pages 220. By freeing the hinted memory pages 220 along with the memory location or memory page 220B that stores the list 230, the hypervisor 180 advantageously performs memory handling (e.g., freeing, persisting, etc.) without the additional overhead associated with persisting memory pages 220 that should be freed as well as the overhead of permanently storing a list 230 of hints.

In some examples, the memory page hint data structure or list 230 includes an entry corresponding to each memory page of the guest memory (e.g., guest memory 195A-C). Other data structures such as one or more tables, linked lists, and so forth may also be used instead of or in addition to list 230. The memory page hint data structure may be any data structure that may indicate a use status of a memory page. Additionally, each entry in the list 230 may be structured to include a data value that has a size of a bit, byte, or other length. In some examples, the list 230 mat be stored in the guest memory (e.g., guest memory 195A-C). In other examples, the list 230 may be stored in another address space that is not included in the guest memory. For example, the hypervisor 180 may store the list 230 in a memory that is allocated to the hypervisor 180 and is not included in the guest memory (e.g., guest memory 195A-C).

Figure 4:
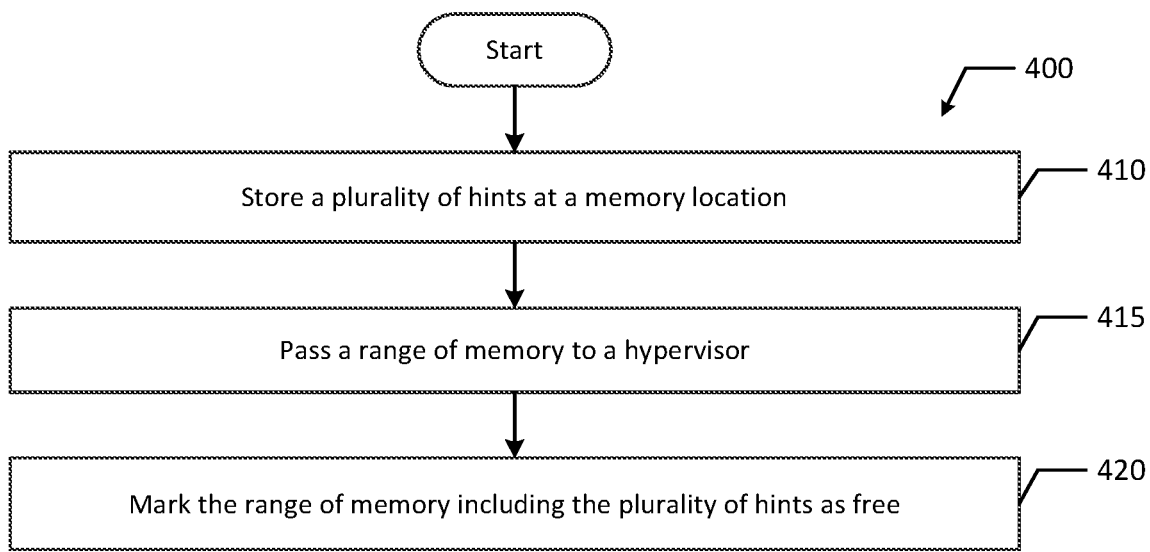
FIG. 4 illustrates a flowchart of an example process for free page hinting according to an example embodiment of the present disclosure.

FIG. 4 illustrates a flowchart of an example method 400 for free page hinting according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated or iterated, and some of the blocks described are optional. The method 400 may be performed by processing logic that may comprise hardware (circuitry, dedicated logic, etc.), software, or a combination of both.

The example method 400 includes storing a plurality of hints at a memory location (block 410). For example, a guest OS 196 may store a plurality of hints at a memory location. Each hint 230 may include an address value and the memory location of the plurality of hits may be included in one of the respective address values. In an example, the hints may be stored in a list 230. Similar to method 300, the hints may include address values, pointers 240, lengths, address-length pairs or address-length tuples.

Then, method 400 includes passing a range of memory to a hypervisor (block 415). For example, the guest OS 196 may pass the range of memory to the hypervisor where the range of memory includes the memory location. In an example, the range of memory may include a plurality of memory pages 220. The range of memory may be a contiguous range of memory (e.g., consecutive memory pages forming a contiguous or continuous range or region of memory). The range of memory may be fragmented, unconnected or made up of memory pages 220 that are spread apart or distant from each other. In an example, each address value in the plurality of hints may point to a respective memory page 220 of the range of memory.

Method 400 also includes marking the range of memory including the plurality of hints as free (block 420). For example, the hypervisor 180 may mark the range of memory including the plurality of hints as free. Additionally, the range of memory may include the respective address values associated with the plurality of hints. For example, the range of memory may store the address values or other hint information (e.g., pointers 240, lengths, address-length pairs or address-length tuples). The hypervisor may mark the range of memory as free or "clean" by indicating that each memory page 220 of the range of memory is free or "clean." Once a memory page 220 is marked as free or "clean," the hypervisor may discard the contents of the memory page 220. After the contents are discarded, the hypervisor 180 may allocate new memory (e.g., memory that is "clean" or does not contain any data, contents or information) to the guest OS 196.

As mentioned above, the memory page(s) 220 that make up the range of memory may include unnecessary or old data that may have been once used by the guest OS 196, but is no longer useful. Even though the data is no longer useful, the memory page 220C appears "dirty" to the hypervisor 180 such that the hypervisor 180 may spend valuable CPU time persisting memory page 220C. However, by indicating that memory page(s) 220 or range of memory should be freed and by including a hint (e.g., address) to the memory location storing the other hints, the hypervisor 180 may free the entire range of memory including the memory location storing the hints. Specifically, the hypervisor 180 may discard the contents stored in the range of memory without spending any time persisting the memory. Therefore, the hypervisor 180 may efficiently free a range of memory by marking the pages as free or "clean" and discarding the old contents stored in the range of memory. By freeing the hinted range of memory along with the memory location (e.g., memory page 220B) that stores the hints (e.g., list 230), the hypervisor 180 advantageously performs memory handling (e.g., freeing, persisting, etc.) without the additional overhead associated with persisting memory that should be freed as well as the overhead of permanently storing the hints.

In some examples, a memory page 220 or other memory location may be hinted because it is a duplicate of another page in memory. For example, the guest OS 196 may only need future access to one of the pages and the other duplicate page may be freed. Similar to freeing other memory pages, the hypervisor 180 may deduplicate the page by discarding the memory page or by making the page invalid in host page tables and reuse the page.

Figure 5A:
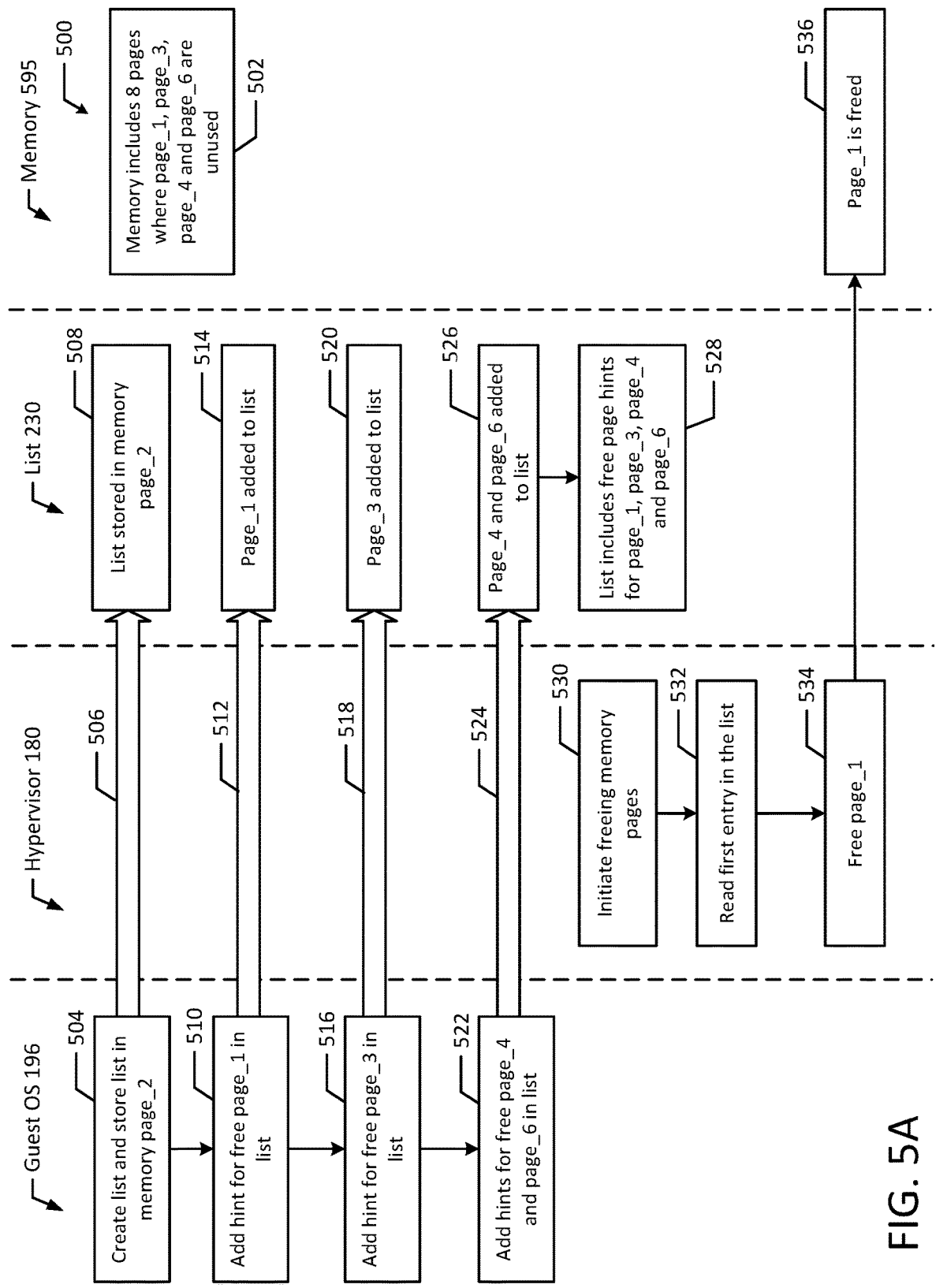
FIGS. 5A and 5B illustrate a flow diagram of an example process for virtual machine free page hinting according to an example embodiment of the present disclosure.
Figure 5B:
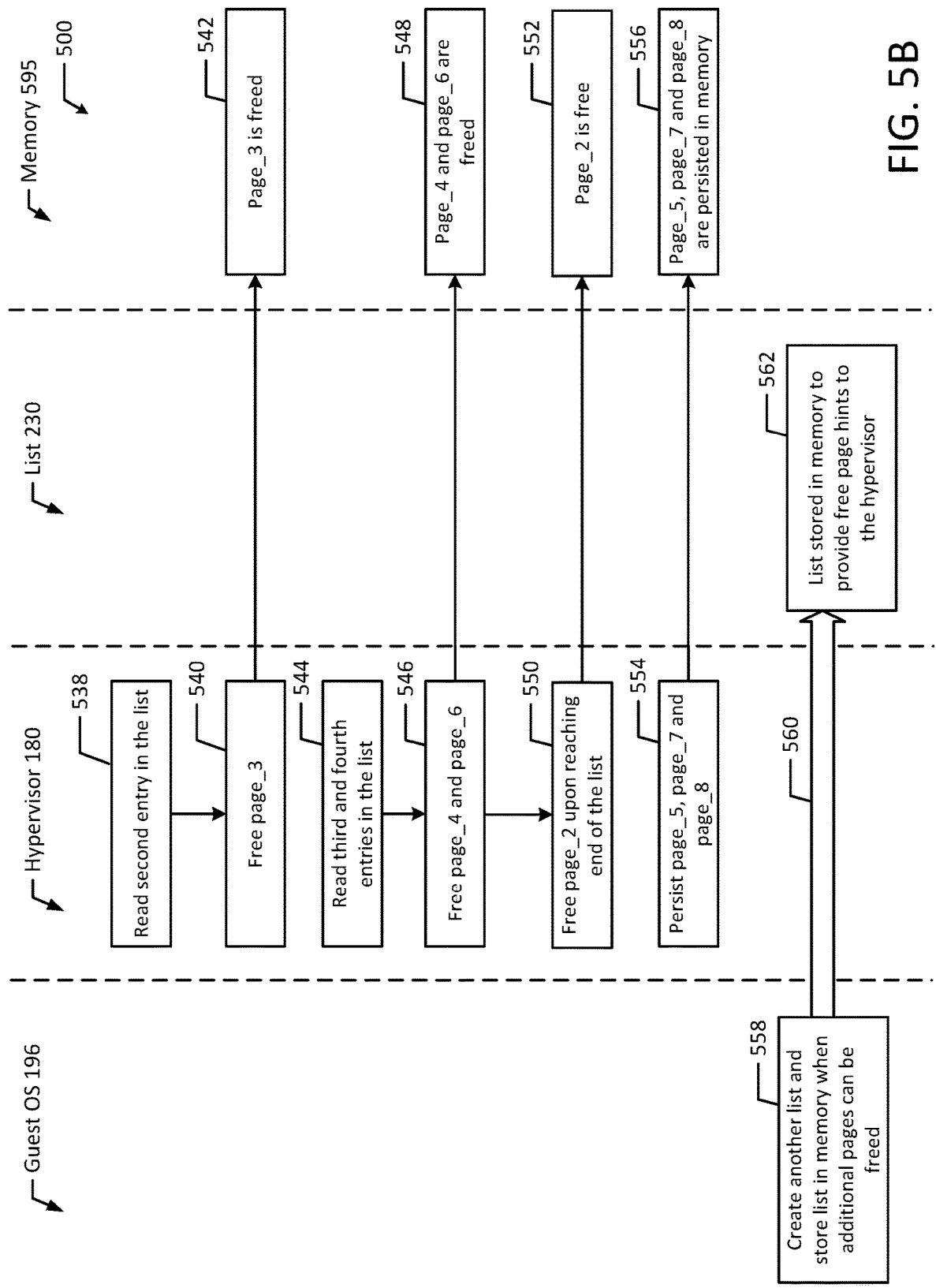

FIGS. 5A and 5B illustrate a flowchart of an example method 500 for virtual machine free page hinting in accordance with an example of the present disclosure. Although the example method 500 is described with reference to the flowchart illustrated in FIGS. 5A and 5B it will be appreciated that many other methods of performing the acts associated with the method 500 may be used. For example, the order of some of the blocks may be changed, certain blocks may be combined with other blocks, blocks may be repeated or iterated, and some of the blocks described are optional. For example, a hypervisor 180 and guest OS 196 may communicate with a list 230 and memory 595 to perform example method 500.

In the illustrated example, memory 595 (e.g., virtual machine memory) includes eight memory pages 220 (block 502). For example, the virtual machine memory 595 may include "page_1" to "page_8", where "page_1", "page_3", "page_4" and "page_6" are unused. As discussed above, an unused page_172 may be a page that has yet to be used by the guest OS 196 or a page that is no longer used by the guest OS 196. The memory 595 may be a combination of unused pages 172 and used pages 174. The guest OS 196 may create a list 230 and store the list in "page_2." (block 504). Storing the list in memory "page_2" is indicated by arrow 506. Then, the list 230 is stored in "page_2." (block 508). Since "page_2" includes the list 230, the page is viewed as "dirty" or used by the hypervisor 180 and may typically be scanned by the hypervisor 180 or persisted by the hypervisor 180.

Then, the guest OS 196 adds a hint 512 for free "page_1" in the list 230 (block 510). The hint may be an address value associated with "page_1". In another example, the hint 512 may be a pointer 240 that points to "page_1". In another example, the hint 512 may be an address-length pair or address-length tuple that indicates the address of the start of "page_1" along with the length of "page_1". Then, "page_1" is added to the list 230 (block 514). For example, the hint for "page_1" may be the first entry in the list 230. Similarly, guest OS 196 may add a hint 518 for free "page_3" in the list 230 (block 516). As mentioned above, the hint 518 may include an address, pointer 240 or combination thereof. Then, "page_3" is added to the list 230 (block 520). For example, the hint for "page_3" may be the second entry in the list 230.

Similar to the hints for "page_1" and "page_3", the guest OS 196 may add hints 524 for free "page_4" and free "page_6" in the list 230 (block 522). The hints 524 may be added to the list 230 consecutively or concurrently. For example, the guest OS 196 may add hints (e.g., hints 512 and 518) one-by-one or may add hints (e.g., hints 524) in groups or batches. Then, "page_4" and "page_6" are added to the list 230 (block 526). For example, the hint for "page_4" and the hint for "page_6" may be added as the third and fourth entries in the list 230. Now the list includes free page hints for "page_1", "page_3", "page_4" and "page_6" (block 528).

The hypervisor 180 may initiate freeing memory pages (block 530). In an example, the hypervisor 180 may initiate freeing memory pages 220 after the list 230 is passed to the hypervisor 180. For example, the list 230 may be included in a portion of memory that the guest OS In another example, the hypervisor 180 may periodically check a memory location that is earmarked to store the list 230 and may start freeing memory pages once a new list is detected. In the illustrated example, the hypervisor 180 reads the first entry in the list 230 (block 532). For example, the hypervisor 180 reads the hint 512 for "page_1", which is the first entry in the list 230. The hint 512 may indicate (e.g., point to or direct the hypervisor 180 to) a specific location in memory or may indicate a specific memory page_220. Then, the hypervisor 180 may free "page_1" (block 534). For example, the hypervisor 180 may mark "page_1" as free or "clean." Now, "page_1" is freed (block 536). A freed memory page (e.g., "page_1") may be used again by guest OS 196 or an application 198 as the previous contents of the memory page_220 have been discarded by the hypervisor so that the memory page_220 is ready for reuse.

Continuing on FIG. 5B, the hypervisor 180 reads the second entry in the list 230 (block 538). For example, the hypervisor 180 reads the hint 518 for "page_3", which is the second entry in the list 230. Similar to hint 512, the hint 518 may indicate a specific location in memory or a specific memory page_220 (e.g., memory "page_3"). Then, the hypervisor 180 may free "page_3" (block 540). For example, the hypervisor 180 may mark "page_3" as free or "clean." Now, "page_3" is freed (block 542).

Similarly, the hypervisor 180 reads the third and fourth entries in the list 230 (block 544). For example, the hypervisor 180 may read the hints 524 for "page_4" and "page_6", which are the third and fourth entries in the list 230. It should be appreciated that the hypervisor 180 may read the entire list 230 before freeing memory pages 220. The hints 524 may be read consecutively (e.g., in order) or concurrently (e.g., at the same time or in parallel) by the hypervisor 180. Then, the hypervisor 180 may free "page_4" and "page_6" (block 546). For example, the hypervisor 180 may mark "page_4" and "page_6" as free or "clean." Now, "page_4" and "page_6" are both freed (block 548). For example, the hypervisor 180 may free the memory pages 220 in batches or in groups.

Upon reaching the end of the list 230, the hypervisor 180 may free "page_2" (block 550). For example, the hypervisor may be configured or programmed to act on the memory page (e.g., "page_2") that stores the hints or list 230 of hints as if that memory page 220 (e.g., "page_2") was hinted to the hypervisor 180. In another example, the memory page_220 storing the list may be included as the last hint on the list 230. Now, "page_2" is freed (block 552). For example, each page of hinted memory (e.g., "page_1", "page_3", "page_4" and "page_6") along with the memory storing the hints (e.g., "page_2") is freed by the hypervisor 180. The memory storing the hints (e.g., "page_2") may include other contents or data that are no longer used by the guest OS 196. For example, the memory storing the hints may have been selected by the guest OS 196 because that memory may have already been used by the guest OS 196 and the memory would have otherwise sat idle and unused until it was freed by the hypervisor 180. For example, "page_2" may be memory that the guest OS 196 intended to free up. By choosing such memory (e.g., "page_2) to store the list 230, other unused memory may be reserved for purposes and functions other than hinting. The freed memory pages may be used again by guest OS 196 or an application 198 as the previous contents of the memory pages 220 have been discarded by the hypervisor 180.

The other memory pages (e.g., "page_5", "page_7" and "page_8") may include contents or data (e.g., shopping cart data) that should be retained by the system. In the illustrated example, the hypervisor 180 may persist "page_5", "page_7" and "page_8" (bock 554). Then, "page_5", "page_7" and "page_8" are persisted in memory 595 (block 556). By utilizing the list 230 of free page hints, the hypervisor 180 can efficiently free memory pages and persist other memory pages. Additionally, by freeing the memory associated with the list 230, the system and methods disclosed herein advantageously reduces the additional memory consumption overhead associated with other free page hinting techniques.

When additional memory pages are ready for freeing, the guest OS 196 may create another list 230 and store the list in memory 595 (blocks 558 and 560). Then, the list 230 is stored in memory 595 to provide free page hints to the hypervisor 180 (block 562). The list 230 may be stored in the same memory page (e.g., "page_2") that was recently freed by the hypervisor 180. In another example, the guest OS 196 may store the list 230 in a different location or in a memory page_220 that the guest OS 196 wishes to free. Since different memory may be used to store hints when the guest wants to free up memory, memory that the guest intends to free up may be used to store the hints, thereby reserving other unused memory for purposes and functions other than hinting. For example, freeing the memory used to store the hints instead of permanently reserving memory for the sole purpose of hinting advantageously saves up to 0.4 percent of the memory. Additionally, if a different location is used to store the list 230, the guest OS 196 may notify the hypervisor 180 of the new location of the list 230.

Figure 6:
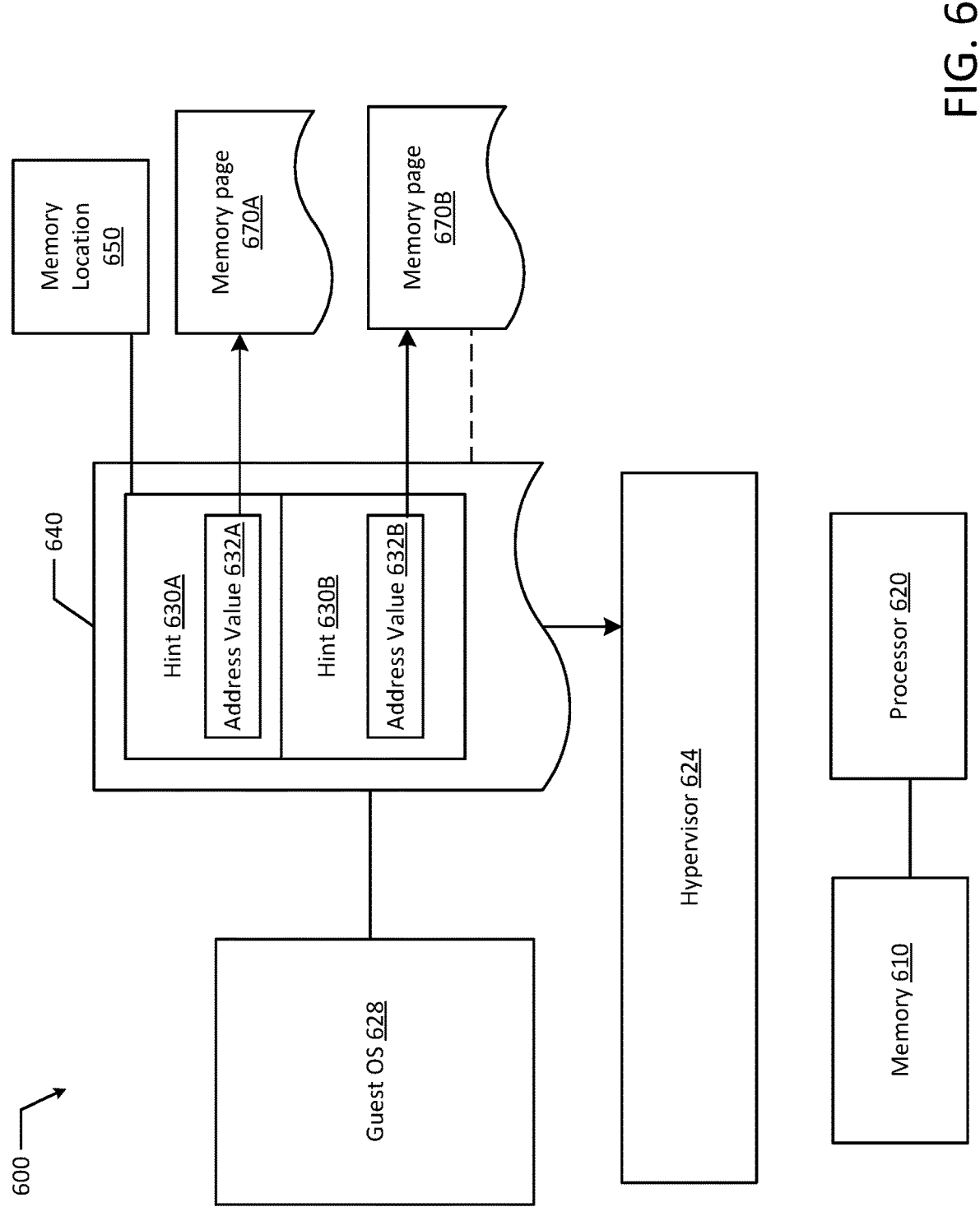
FIG. 6 illustrates a block diagram of an example free page hinting system according to an example embodiment of the present disclosure.

FIG. 6 is a block diagram of an example virtual machine free page hinting system 600 according to an example of the present disclosure. The free page hinting system 600 may provide an indirect interface for free page hinting. The free page hinting system 600 includes a memory 610, a processor 620 in communication with the memory 610, a hypervisor 624, and a guest OS 628. The guest OS 628 may be configured to store a plurality of hints 630A-B in a list 640 at a memory location 650. Each hint 630A-B may include an address value 632A-B and the memory location 650 of the list 640 may be included in one of the respective address values 632A-B associated with the plurality of hints 630A-B. Additionally, the guest OS 628 may be configured to pass the list 640 to the hypervisor 624. Each address value 632A-B may point to a respective memory page_670A-B of a plurality of memory pages 670A-B including a first memory page_670A and a last memory page 670B. The hypervisor may be configured to free the first memory page_670A pointed to by a first hint 630A of the plurality of hints 630A-B and may be configured to free the last memory page_670B pointed to by a second hint 630B of the plurality of hints 630A-B. In an example, the last memory page_670B includes the list 640.

Figure 7:
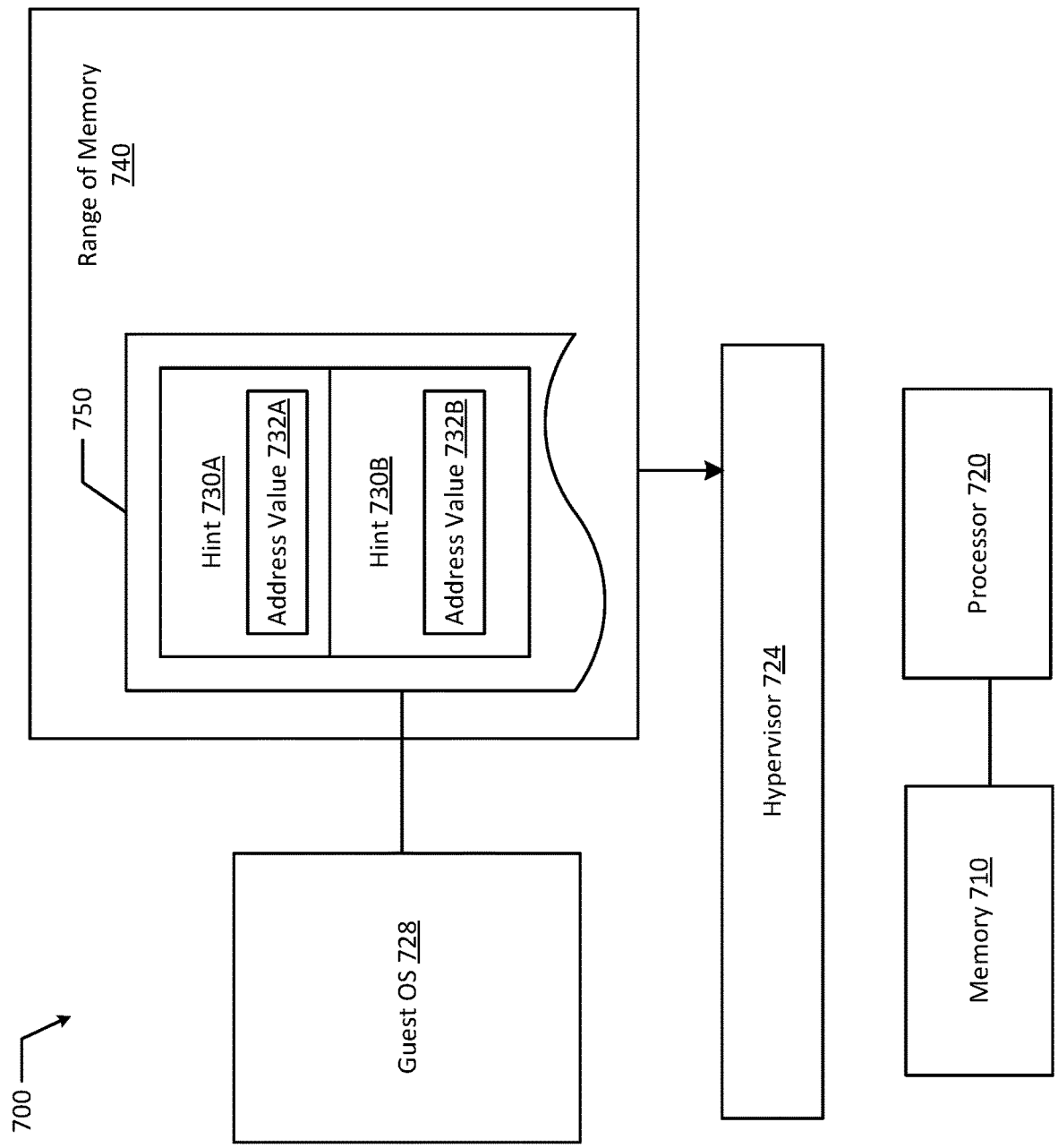
FIG. 7 illustrates a block diagram of an example free page hinting system according to an example embodiment of the present disclosure.

FIG. 7 is a block diagram of an example virtual machine free page hinting system 700 according to an example of the present disclosure. The free page hinting system 700 may provide an indirect interface for free page hinting. The free page hinting system 700 includes a memory 710, a processor 720 in communication with the memory 710, a hypervisor 724, and a guest OS 728. The guest OS 728 may be configured to store a plurality of hints 730A-B at a memory location 750. Each hint 630A-B may include an address value 632A-B and the memory location 750 of the plurality of hints 730A-B may be included in one of the respective address values 732A-B. Additionally, the guest OS 728 may be configured to pass a range of memory 740 to the hypervisor 724. The range of memory 740 may include the memory location 750. The hypervisor may be configured to mark the range of memory 740 including the plurality of hints 730A-B as free. The range of memory 740 includes the respective address values 732A-B associated with the plurality of hints 730A-B.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure a system includes a memory, a processor in communication with the memory, a hypervisor, and a guest OS. The guest OS is configured to store a plurality of hints in a list at a memory location. Each hint includes an address value and the memory location of the list is included in one of the respective address values associated with the plurality of hints. The guest OS is also configured to pass the list to the hypervisor. Each address value points to a respective memory page of a plurality of memory pages including a first memory page and a last memory page. The hypervisor is configured to free the first memory page pointed to by a first hint of the plurality of hints and free the last memory page pointed to by a second hint of the plurality of hints. Additionally, the last memory page includes the list.

In a 2nd exemplary aspect of the present disclosure, which may be used in combination with any one or more of the preceding aspects (e.g., the 1st aspect), each address value is associated with a respective length as a respective pair, and the respective pair is a pair of 64-bit values.

In a 3rd exemplary aspect of the present disclosure, which may be used in combination with any one or more of the preceding aspects (e.g., the 1st aspect), the memory location is the last memory page.

In a 4th exemplary aspect of the present disclosure, which may be used in combination with any one or more of the preceding aspects (e.g., the 1st aspect), the plurality of memory pages are included in a range of memory.

In a 5th exemplary aspect of the present disclosure, which may be used in combination with any one or more of the preceding aspects (e.g., the 1st aspect), freeing the first memory page includes marking the first memory page as free.

In a 6th exemplary aspect of the present disclosure, which may be used in combination with any one or more of the preceding aspects (e.g., the 1st aspect), the hypervisor is further configured to discard the list.

In a 7th exemplary aspect of the present disclosure, which may be used in combination with any one or more of the preceding aspects (e.g., the 6th aspect), the list is discarded after each respective memory page of the plurality of memory pages is freed.

In an 8th exemplary aspect of the present disclosure, which may be used in combination with any one or more of the preceding aspects (e.g., the 1st aspect), the hypervisor is configured to free the plurality of memory pages according to the order the hints appear in the list.

Aspects of the subject matter described herein may be useful alone or in combination with one or more other aspects described herein. In a 9th exemplary aspect of the present disclosure a method includes storing, by a guest OS, a plurality of hints in a list at a memory location. Each hint includes an address value and the memory location of the list is included in one of the respective address values associated with the plurality of hints. The method also includes passing, by the guest OS, the list to a hypervisor. Each address value points to a respective memory page of a plurality of memory pages including a first memory page and a last memory page. Additionally, the method includes freeing, by the hypervisor, the first memory page pointed to by a first hint of the plurality of hints, and freeing, by the hypervisor, the last memory page pointed to by a second hint of the plurality of hints. Additionally, the last memory page includes the list.

In an 10th exemplary aspect of the present disclosure, which may be used in combination with any one or more of the preceding aspects (e.g., the 9th aspect), each address value is associated with a respective length as a respective pair, the respective pair is a pair of 64-bit values.

In an 11th exemplary aspect of the present disclosure, which may be used in combination with any one or more of the preceding aspects (e.g., the 9th aspect), the memory location is the last memory page.

In a 9th exemplary aspect of the present disclosure, which may be used in combination with any one or more of the preceding aspects (e.g., the 11th aspect), the plurality of memory pages are included in a range of memory.

In a 13th exemplary aspect of the present disclosure, which may be used in combination with any one or more of the preceding aspects (e.g., the 9th aspect), freeing the first memory page includes marking the first memory page as free.

In a 14th exemplary aspect of the present disclosure, which may be used in combination with any one or more of the preceding aspects (e.g., the 9th aspect), the method further includes discarding, by the hypervisor, the list.

In a 15th exemplary aspect of the present disclosure, which may be used in combination with any one or more of the preceding aspects (e.g., the 14th aspect), the list is discarded after each respective memory page of the plurality of memory pages is freed.

In a 16th exemplary aspect of the present disclosure, which may be used in combination with any one or more of the preceding aspects (e.g., the 9th aspect), the hypervisor frees the plurality of memory pages according to the order the hints appear in the list.

Aspects of the subject matter described herein may be useful alone or in combination with one or more other aspects described herein. In a 17th exemplary aspect of the present disclosure a non-transitory machine-readable medium stores code, which when executed by a processor is configured to store a plurality of hints in a list at a memory location. Each hint includes an address value and the memory location of the list is included in one of the respective address values associated with the plurality of hints. The non-transitory machine-readable medium is also configured to pass the list to a hypervisor. Each address value points to a respective memory page of a plurality of memory pages including a first memory page and a last memory page. Additionally, the non-transitory machine-readable medium is configured to free the first memory page pointed to by a first hint of the plurality of hints, and free the last memory page pointed to by a second hint of the plurality of hints. Additionally, the last memory page includes the list.

Aspects of the subject matter described herein may be useful alone or in combination with one or more other aspects described herein. In an 18th exemplary aspect of the present disclosure a system includes a means for storing a plurality of hints in a list at a memory location. Each hint includes an address value and the memory location of the list is included in one of the respective address values associated with the plurality of hints. The system also includes a means for passing the list to a hypervisor. Each address value points to a respective memory page of a plurality of memory pages including a first memory page and a last memory page. Additionally, the system includes a first means for freeing the first memory page pointed to by a first hint of the plurality of hints, and a second means for freeing the last memory page pointed to by a second hint of the plurality of hints. Additionally, the last memory page includes the list.

Aspects of the subject matter described herein may be useful alone or in combination with one or more other aspects described herein. In a 19th exemplary aspect of the present disclosure a system includes a memory, a processor in communication with the memory, a hypervisor, and a guest OS. The guest OS is configured to store a plurality of hints at a memory location. Each hint includes an address value and the memory location of the plurality of hints is included in one of the respective address values. The guest OS is also configured to pass a range of memory to the hypervisor. The range of memory includes the memory location. The hypervisor is configured to mark the range of memory including the plurality of hints as free. Additionally, the range of memory includes the respective address values associated with the plurality of hints.

In a 20th exemplary aspect of the present disclosure, which may be used in combination with any one or more of the preceding aspects (e.g., the 19th aspect), each address value is associated with a respective length as a respective pair, and the respective pair is a pair of 64-bit values.

In a 21st exemplary aspect of the present disclosure, which may be used in combination with any one or more of the preceding aspects (e.g., the 19th aspect), the memory location is a memory page.

In a 22nd exemplary aspect of the present disclosure, which may be used in combination with any one or more of the preceding aspects (e.g., the 21st aspect), the plurality of hints are saved as entries in a list in the memory page.

In a 23rd exemplary aspect of the present disclosure, which may be used in combination with any one or more of the preceding aspects (e.g., the 22nd aspect), the range of memory is a plurality of memory pages.

In a 24th exemplary aspect of the present disclosure, which may be used in combination with any one or more of the preceding aspects (e.g., the 23rd aspect), each hint in the list points to a respective memory page of the plurality of memory pages in the range of memory.

In a 25th exemplary aspect of the present disclosure, which may be used in combination with any one or more of the preceding aspects (e.g., the 24th aspect), the hypervisor is configured to mark the memory page with the plurality of hints as if the memory page itself was hinted.

In a 26th exemplary aspect of the present disclosure, which may be used in combination with any one or more of the preceding aspects (e.g., the 24th aspect), the hypervisor is configured to act on the plurality of hints in the order the hints appear in the list.

Aspects of the subject matter described herein may be useful alone or in combination with one or more other aspects described herein. In a 27th exemplary aspect of the present disclosure a method includes storing, by a guest OS, a plurality of hints at a memory location. Each hint includes an address value and the memory location of the plurality of hints is included in one of the respective address values. The method also include passing, by a guest OS, a range of memory to the hypervisor. The range of memory includes the memory location. Additionally, the method includes marking, by the hypervisor, the range of memory including the plurality of hints as free. The range of memory includes the respective address values associated with the plurality of hints.

In a 28th exemplary aspect of the present disclosure, which may be used in combination with any one or more of the preceding aspects (e.g., the 27th aspect), each address value is associated with a respective length value as a respective pair, the respective pair is a pair of 64-bit values.

In a 29th exemplary aspect of the present disclosure, which may be used in combination with any one or more of the preceding aspects (e.g., the 27th aspect), the memory location is a memory page.

In a 30th exemplary aspect of the present disclosure, which may be used in combination with any one or more of the preceding aspects (e.g., the 29th aspect), the plurality of hints are saved as entries in a list in the memory page.

In a 31st exemplary aspect of the present disclosure, which may be used in combination with any one or more of the preceding aspects (e.g., the 30th aspect), the range of memory is a plurality of memory pages.

In a 32nd exemplary aspect of the present disclosure, which may be used in combination with any one or more of the preceding aspects (e.g., the 31st aspect), each hint in the list points to a respective memory page of the plurality of memory pages in the range of memory.

In a 33rd exemplary aspect of the present disclosure, which may be used in combination with any one or more of the preceding aspects (e.g., the 32nd aspect), the hypervisor is configured to act on the memory page with the plurality of hints as if the memory page itself was hinted.

In a 34th exemplary aspect of the present disclosure, which may be used in combination with any one or more of the preceding aspects (e.g., the 33rd aspect), the hypervisor acts on the plurality of hints in the order the hints appear in the list.

Aspects of the subject matter described herein may be useful alone or in combination with one or more other aspects described herein. In a 35th exemplary aspect of the present disclosure a non-transitory machine-readable medium stores code, which when executed by a processor is configured to store a plurality of hints at a memory location. Each hint includes an address value and the memory location of the plurality of hints is included in one of the respective address values. The non-transitory machine-readable medium is configured to pass a range of memory to a hypervisor. The range of memory includes the memory location. Additionally, the non-transitory machine-readable medium is configured to mark the range of memory including the plurality of hints as free. The range of memory includes the respective address values associated with the plurality of hints.

Aspects of the subject matter described herein may be useful alone or in combination with one or more other aspects described herein. In a 36th exemplary aspect of the present disclosure a system includes a means for storing a plurality of hints at a memory location. Each hint includes an address value and the memory location of the plurality of hints is included in one of the respective address values. The system also includes a means for passing a range of memory to a hypervisor. The range of memory includes the memory location. Additionally, the system includes a means for marking the range of memory including the plurality of hints as free. The range of memory includes the respective address values associated with the plurality of hints.

In a 37th exemplary aspect of the present disclosure, which may be used in combination with any one or more of the preceding aspects, each address value is associated with a respective length as a respective tuple, and the respective tuple is a tuple of 64-bit values.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
a processor in communication with the memory;
a hypervisor; and
a guest operating system (OS) configured to:
generate a list including a plurality of hints for a corresponding plurality of memory pages allocated to the guest OS, wherein an order in which each hint of the plurality of hints appears in the list indicates an order in which the guest OS is permitted to free memory pages of the corresponding plurality of memory pages, wherein order of the hints of the plurality of hints is independent of an order of the memory pages of the corresponding plurality of memory pages in the memory, wherein the order in which the guest OS is permitted to free memory pages of the corresponding plurality of memory pages indicates a first memory page and a last memory page and which indicates that the last memory page is not to be freed before the first memory page is freed, wherein each hint of the plurality of hints includes an address value associated with one memory page of the corresponding plurality of memory pages,
store the list in the last memory page, and
pass the list to the hypervisor, wherein the hypervisor is configured to:
free the first memory page according to the order in which each hint of the plurality of hints appears in the list, and
free the last memory page according to the order in which each hint of the plurality of hints appears in the list.

2. The system of claim 1, wherein each address value is associated with a respective length as a respective pair, the respective pair is a pair of 64-bit values.

3. The system of claim 1, wherein the plurality of memory pages are included in a range of memory.

4. The system of claim 1, wherein freeing the first memory page includes marking the first memory page as free.

5. The system of claim 1, wherein the guest OS is allocated a second plurality of memory pages which comprises the corresponding plurality of memory pages allocated to the guest OS to free and a third plurality of memory pages allocated to the guest OS to persist.

6. The system of claim 1, wherein the last memory page is associated with an earlier address than the first memory page.

7. The system of claim 1, wherein the guest OS is further configured to:
generate, before the hypervisor frees the last memory page, a second list including a second plurality of hints for a corresponding second plurality of memory pages allocated to the guest OS to free according to a second order in which hints of the second plurality of hints appear in the second list, wherein the second order includes at least an initial memory page to free and a final memory page to free, wherein the second order indicates that the final memory page is not to be freed before the initial memory page is freed, wherein each hint of the second plurality of hints includes an associated address value associated with one memory page of the corresponding second plurality of memory pages, wherein the last memory page is included in the second order before the final memory page;
store the second list in the final memory page; and
pass, to the hypervisor, the second list to override the list.

8. The system of claim 1, wherein the first memory page is freed before the last memory page is freed.

9. The system of claim 1, wherein the list includes a hint associated with a second memory page to free, wherein the list indicates that the second memory page is to be freed in parallel as a batch with the first memory page and before the last memory page is freed.

10. The system of claim 1, wherein the order includes a second memory page to free, wherein the order indicates that the second memory page is to be freed after the first memory page is freed and consecutively in-order of hints appearing in the list or in parallel as a batch.

11. A method comprising:
generating, by a guest operating system (OS), a list including a plurality of hints for a corresponding plurality of memory pages allocated to the guest OS, wherein an order in which each hint of the plurality of hints appears in the list indicates an order in which the guest OS is permitted to free memory pages of the corresponding plurality of memory pages, wherein the order of the hints of the plurality of hints is independent of an order of the memory pages of the corresponding plurality of memory pages in the memory, wherein the order in which the guest OS is permitted to free memory pages of the corresponding plurality of memory pages indicates a first memory page and a last memory page and which indicates that the first memory page is to be freed before the last memory page is freed, wherein each hint of the plurality of hints includes an address value associated with one memory page of the corresponding plurality of memory pages;

storing, by the guest OS, the list in the last memory page;

passing, by the guest OS, the list to a hypervisor;

freeing, by the hypervisor, the first memory page according to the order in which each hint of the plurality of hints appears in the list; and freeing, by the hypervisor, the last memory page according to the order in which each hint of the plurality of hints appears in the list.

12. The method of claim 11, wherein freeing the first memory page includes marking the first memory page as free.

13. The method of claim 11, further comprising discarding, by the hypervisor, the list.

14. The method of claim 11, further comprising:

generating, by the guest OS, a second list including a second plurality of hints for a corresponding second plurality of memory pages allocated to the guest OS to free according to a second order in which the second plurality of hints appear in the second list, wherein the second order includes at least an initial memory page to free and a final memory page to free, wherein the second order indicates that the initial memory page is to be freed before the final memory page is freed, wherein each hint of the second plurality of hints includes an associated address value associated with one memory page of the corresponding second plurality of memory pages, wherein the last memory page is included in the second order before the final memory page;

storing the second list in the final memory page; and passing, to the hypervisor, the second list to override the list.

15. A method comprising:

generating, by a guest operating system (OS), a sequentially ordered list including a plurality of hints for a plurality of memory pages allocated to the guest OS, wherein an order in which each hint of the plurality of hints appears in the sequentially ordered list indicates an order in which the guest OS is permitted to free memory pages of the corresponding plurality of memory pages, wherein the order in which the guest OS is permitted to free memory pages of the corresponding plurality of memory pages indicates a first memory page and a last memory page, wherein the guest OS is not permitted to free the last memory page before freeing the first memory page according to the order in which each hint of the plurality of hints appears in the sequentially ordered list, wherein a first hint associated with the first memory page appears in the sequentially ordered list before a last hint associated with the last memory page, wherein each hint of the plurality of hints includes address values associated with memory pages of the plurality of memory pages, wherein the last memory page is associated with an earlier address in the memory than the first memory page;

storing, by the guest OS, the sequentially ordered list in the last memory page;

passing, by the guest OS, a range of memory to a hypervisor, wherein the range of memory includes the last memory page; and freeing the first memory page according to the order in which each hint of the plurality of hints appears in the sequentially ordered list; and freeing the last memory page according to the order in which each hint of the plurality of hints appears in the sequentially ordered list.

16. The method of claim 15, wherein each address value is associated with a respective length value as a respective pair, the respective pair is a pair of 64-bit values.

17. The method of claim 15, wherein the range of memory includes at least two memory pages of the plurality of memory pages.

18. The method of claim 15, wherein the guest OS is allocated a second plurality of memory pages which comprises the corresponding plurality of memory pages allocated to the guest OS to free and a third plurality of memory pages allocated to the guest OS to persist.

19. The method of claim 15, further comprising:

generating, by the guest OS, a second list including a second plurality of hints for a second plurality of memory pages allocated to the guest OS to free according to a second order in which the plurality of hints appear in the second list, wherein an initial hint to free an initial memory page of the second plurality of memory pages appears earlier in the second order than a final hint to free a final memory page of the second plurality of memory pages, wherein each hint of the second plurality of hints includes address values associated with memory pages of the second plurality of memory pages, wherein the last memory page is included in the second ccqucntial order before the final memory page;

storing the second list in the final memory page; and passing, to the hypervisor, the second list to override the sequentially ordered list.

* * * * *